United States Patent
Vikram et al.

(10) Patent No.: US 12,484,030 B2
(45) Date of Patent: Nov. 25, 2025

(54) APPARATUS AND METHOD FOR TIME DOMAIN BANDWIDTH PART (TD-BWP) SWITCHING

(71) Applicant: Apple Inc., Cupertino, CA (US)

(72) Inventors: Sushant Vikram, San Diego, CA (US); Gibran Ali, San Jose, CA (US); Pradeep S. Sharma, Cupertino, CA (US); Ajay Singh, San Jose, CA (US); Deepankar Bhattacharjee, San Jose, CA (US); Guillaume Monghal, San Diego, CA (US)

(73) Assignee: APPLE INC., Cupertino, CA (US)

( * ) Notice: Subject to any disclaimer, the term of this patent is extended or adjusted under 35 U.S.C. 154(b) by 422 days.

(21) Appl. No.: 17/944,391

(22) Filed: Sep. 14, 2022

(65) Prior Publication Data
US 2024/0089933 A1    Mar. 14, 2024

(51) Int. Cl.
| | |
|---|---|
| H04W 72/0446 | (2023.01) |
| H04B 17/336 | (2015.01) |
| H04L 1/1812 | (2023.01) |
| H04W 72/23 | (2023.01) |

(52) U.S. Cl.
CPC ...... *H04W 72/0446* (2013.01); *H04B 17/336* (2015.01); *H04L 1/1812* (2013.01); *H04W 72/23* (2023.01)

(58) Field of Classification Search
CPC .............. H04W 72/0446; H04W 72/23; H04B 17/336; H04L 1/1812
See application file for complete search history.

(56) References Cited

U.S. PATENT DOCUMENTS

| | | | |
|---|---|---|---|
| 10,736,046 B2 | 8/2020 | Molavianjazi et al. |
| 10,834,749 B2 | 11/2020 | Kim et al. |
| 11,424,878 B2 | 8/2022 | Da Silva et al. |
| 11,523,441 B2 | 12/2022 | Jeon et al. |

(Continued)

FOREIGN PATENT DOCUMENTS

KR        20190038300 A        4/2019

OTHER PUBLICATIONS

3GPP TS 38.133 V17.6.0 (Jun. 2022), 3rd Generation Partnership Project; Technical Specification Group Radio Access Network; NR; Requirements for support of radio resource management (Release 17); 3637 pages.

(Continued)

*Primary Examiner* — Duc C Ho
(74) *Attorney, Agent, or Firm* — STERNE, KESSLER, GOLDSTEIN & FOX P.L.L.C.

(57) ABSTRACT

Some aspects of this disclosure relate to apparatuses and methods for implementing time domain bandwidth part (TD-BWP) switch for balancing between the UE power consumption and a latency of the UE. For example, a UE can be configured to add a plurality of padding bits to a transport block (TB) to reach a predetermined slot capacity for one transmission time interval (TTI) associated with UE traffic in response to determining that a parameter associated with the UE traffic meets a condition. The UE can be further configured to transmit the TB over the TTI to the base station and receive a message from the base station. The UE is further configured to change a time domain bandwidth part (TD-BWP) based on the received message.

19 Claims, 7 Drawing Sheets

(56) References Cited

U.S. PATENT DOCUMENTS

| | | | |
|---|---|---|---|
| 11,751,236 B2* | 9/2023 | Yan | H04W 72/56 370/329 |
| 2019/0104543 A1 | 4/2019 | Park | |
| 2019/0149308 A1 | 5/2019 | Son | |
| 2019/0349116 A1 | 11/2019 | Hosseini et al. | |
| 2020/0107308 A1 | 4/2020 | Liao et al. | |
| 2020/0329506 A1 | 10/2020 | Liu et al. | |
| 2020/0374045 A1 | 11/2020 | Yin et al. | |
| 2021/0298052 A1 | 9/2021 | Namba et al. | |
| 2021/0314917 A1* | 10/2021 | Lee | H04B 7/0404 |
| 2021/0385829 A1 | 12/2021 | Reial et al. | |
| 2022/0039101 A1* | 2/2022 | Wang | H04W 52/0206 |
| 2022/0166595 A1 | 5/2022 | Laselva et al. | |
| 2022/0167267 A1 | 5/2022 | Ma et al. | |
| 2022/0173879 A1 | 6/2022 | Pelletier et al. | |
| 2022/0303812 A1 | 9/2022 | Chung et al. | |
| 2022/0376863 A1 | 11/2022 | Da Silva et al. | |
| 2023/0092704 A1 | 3/2023 | Zhang et al. | |
| 2023/0164692 A1 | 5/2023 | Kuang et al. | |
| 2024/0090007 A1 | 3/2024 | Vikram et al. | |
| 2024/0137918 A1 | 4/2024 | Abotabl et al. | |
| 2024/0291601 A1 | 8/2024 | Vikram et al. | |
| 2024/0389107 A1 | 11/2024 | Xie et al. | |

OTHER PUBLICATIONS

U.S. Appl. No. 17/944,362, "Apparatus And Method For Time Domain Bandwidth Part (TD-BWP) Switching," to Vikram et al., filed Sep. 14, 2022.

U.S. Appl. No. 18/115,485, "Time Domain Bandwidth Part (TD-BWP) Switching For Carrier Aggregation," to Vikram et al., filed Feb. 28, 2023.

Reial et al., "A technical look at 5G mobile device energy efficiency," Feb. 27, 2020; 10 pages.

3GPP TS 38.211 V17.2.0 (Jun. 2022), 3rd Generation Partnership Project; Technical Specification Group Radio Access Network; NR; Physical channels and modulation (Release 17); 136 pages.

3GPP TS 38.321 V17.1.0 (Jun. 2022), 3rd Generation Partnership Project; Technical Specification Group Radio Access Network; NR; Medium Access Control (MAC) protocol specification (Release 17); 241 pages.

3GPP TS 38.331 V17.1.0 (Jun. 2022), 3rd Generation Partnership Project; Technical Specification Group Radio Access Network; NR; Radio Resource Control (RRC) protocol specification (Release 17); 1273 pages.

NEC, "CR to TS 38.133 on DCI based BWP switch requirements applicability," 3GPP TSG-RAN WG4 Meeting #97-e, E-Meeting, Nov. 2, 2020-Nov. 13, 2020, R4-2017335; 3 pages.

Intel, "Draft CR to TS 38.133 RRM requirement: BWP switching on multiple CCs RRM requirements," 3GPP TSG-RAN WG4 Meeting #94-e-bis, Electronic Meeting, Apr. 20-30, 2020, R4-2003652; 5 pages.

MediaTek Inc., "Discussion on BWP requirements for multiple CCs," 3GPP TSG-RAN WG4 Meeting #95-e, Electronic Meeting, May 25-Jun. 5, 2020, R4-2006477; 4 pages.

International Search Report and Written Opinion directed to International Application No. PCT/US2023/073846, mailed Jan. 8, 2024; 10 pages.

Extended European search report directed to European Application No. 24157390.6, mailed Jul. 5, 2024; 16 pages.

"5G NR Bandwidth Part (BWP)," 5G NR, Future Network Optimization, Interviews, New Radio, NR, Tech Fundas, Sep. 28, 2018, 3 pages.

"Summary#1 on mechanisms to support group scheduling for RRC_CONNECTED UEs for NR MBS," 3GPP TSG RAN WG1 #103-e e-Meeting, R1-2008940, Oct. 26-Nov. 13, 2020, 62 pages.

International Search Report and Written Opinion directed to related International Application No. PCT/US2023/073842, mailed Jan. 8, 2024; 14 pages.

Qualcomm Incorporated: "Power Saving Techniques for XR" 3GPP Draft, R1-2207253, Aug. 12, 2022; 33 pages.

CATT: "UE Power Saving Scheme with Adaptation", 3GPP Draft, R1-1900344, Jan. 12, 2019; 12 pages.

ERICSSON: "Summary of email discussion [96b-NR-1 1]", 3GPP Draft, R1-1905915, Apr. 26, 2019; 7 pages.

\* cited by examiner

APPARATUS AND METHOD FOR TIME DOMAIN BANDWIDTH PART (TD-BWP) SWITCHING

BACKGROUND

Field

The described aspects generally relate to mechanisms for time domain bandwidth part (TD-BWP) switch for balancing between a user equipment (UE) power consumption and a user experience using the UE.

Related Art

In some examples, a network can define two time domain bandwidth parts (TD-BWP) for a user equipment (UE) to use to, for example, to receive downlink (DL) data or control signaling and/or to transmit uplink (UL) data or control signaling. For example, the TD-BWP can include BWP #1 and BWP #2. The BWP #1 can be used when data activity is high and the BWP #2 can be used when the data activity is low (or there is no data activity). For example, the BWP #1 can be used for dense Physical Downlink Control Channel (PDCCH) monitoring occasions. The BWP #2 can be used for sparse PDCCH monitoring occasions. Using the BWP #2 can help the UE to save energy (e.g., save battery) by transmitting and/or receiving data/control sparsely. However, if the UE is in the BWP #2 but the UE is experiencing delays and retransmissions in UE traffic to the network, the latency of the UE is affected in view of saving battery power by staying in the BWP #2.

SUMMARY

Some aspects of this disclosure relate to apparatuses and methods for implementing time domain bandwidth part (TD-BWP) switch for balancing between the UE power consumption and a latency of the UE. For example, some aspects of this disclosure relate to apparatuses and methods for implementing mechanisms the TD-BWP switch based on the UE triggering padded transport block (TB) based on a number of retransmissions, a block error rate (BLER), and/or a traffic type. Additionally, or alternatively, some aspects of this disclosure relate to apparatuses and methods for implementing mechanisms the TD-BWP switch based on the UE transmitting predetermined message(s) to the network. Additionally, or alternatively, some aspects of this disclosure relate to apparatuses and methods for implementing mechanisms the TD-BWP switch based on additional measurements performed by the UE and/or the network.

Some aspects of this disclosure relate to a user equipment (UE). The UE includes a transceiver configured to enable wireless communication with a base station and a processor communicatively coupled to the transceiver. The processor can be configured to add a plurality of padding bits to a transport block (TB) to reach a predetermined slot capacity for one transmission time interval (TTI) associated with UE traffic in response to determining that a parameter associated with the UE traffic meets a condition. The processor is further configured to transmit, using the transceiver, the TB over the TTI to the base station and receive, using the transceiver, a message from the base station. The processor is further configured to change a time domain bandwidth part (TD-BWP) based on the received message.

In some aspects, to determine that the parameter associated with the UE traffic meets the condition, the processor is configured to measure a block error rate (BLER) associated with the traffic and compare the BLER with a threshold. In response to the BLER being greater than the threshold, the processor is further configured to determine that the parameter associated with the UE traffic meets the condition.

In some aspects, to determine that the parameter associated with the UE traffic meets the condition, the processor is configured to measure a number of retransmissions associated with the UE traffic and compare the number of retransmissions with a threshold. In response to the number of retransmissions being greater than the threshold, the processor is further configured to determine that the parameter associated with the UE traffic meets the condition.

In some aspects, to determine that the parameter associated with the UE traffic meets the condition, the processor is configured to measure a traffic type associated with the UE traffic and compare the traffic type with a plurality of traffic types. In response to the traffic type being one of the plurality of traffic types, the processor is further configured to determine that the parameter associated with the UE traffic meets the condition.

In some aspects, the UE is operating at a first TD-BWP and to change the TD-BWP based on the received message, the processor is configured to operate the UE at a second TD-BWP. The first TD-BWP is for low data traffic and the second TD-BWP is for high data traffic. In some aspects, the processor is further configured to switch to the first TD-BWP after a predetermined time period and in response to determining that a second parameter associated with the UE traffic meets a second condition, add a second plurality of padding bits to a second TB to reach a predetermined slot capacity for a second TTI. The processor is further configured to transmit, using the transceiver, the second TB over the second TTI to the base station and receive, using the transceiver, a second message from the base station. The processor is further configured to switch to the second TD-BWP based on the received second message.

In some aspects, the second parameter includes a block error rate (BLER) associated with the UE traffic, a number of retransmissions associated with the UE traffic, or a traffic type associated with the UE traffic and wherein second parameter is different from the parameter. In some aspects, the second parameter is same as the parameter.

In some aspects, the processor is configured to repeat the switching between the first TD-BWP and the second TD-BWP for a predetermined number of time within a second predetermined time period or within a radio resource control (RRC) connection duration. In some aspects, the message includes a downlink control information (DCI) message.

Some aspects of this disclosure relate to a method performed by a user equipment (UE) including adding a plurality of padding bits to a transport block (TB) to reach a predetermined slot capacity for one transmission time interval (TTI) associated with UE traffic in response to determining that a parameter associated with the UE traffic meets a condition. The UE is operating in a first time domain bandwidth part (TD-BWP) for low data traffic. The method further includes transmitting, by the UE, the TB over the TTI to a base station and receiving, by the UE, a message from the base station. The method further includes changing, by the UE, to a second TD-BWP based on the received message. The second TD-BWP is for high data traffic and is different from the first TD-BWP.

Some aspects of this disclosure relate to a non-transitory computer-readable medium storing instructions. When the instructions are executed by a processor of a user equipment (UE), the instructions cause the UE to perform operations including adding a plurality of padding bits to a transport block (TB) to reach a predetermined slot capacity for one transmission time interval (TTI) associated with UE traffic in response to determining that a parameter associated with the UE traffic meets a condition. The UE is operating in a first time domain bandwidth part (TD-BWP) for low data traffic. The operations further include transmitting the TB over the TTI to a base station and receiving a downlink control information (DCI) message from the base station. The operations further include changing to a second TD-BWP based on the received DCI message, wherein the second TD-BWP is for high data traffic and is different from the first TD-BWP.

Some aspects of this disclosure relate to a base station. The base station includes a transceiver configured to enable wireless communication with a user equipment (UE) and a processor communicatively coupled to the transceiver. The UE operates at a first time domain bandwidth part (TD-BWP). The processor can be configured to change the first TD-BWP to a second TD-BWP to be used by the UE in response to determining that a parameter associated with UE traffic meets a condition. The processor is further configured to transmit, using the transceiver, a downlink control information (DCI) message to the UE indicating the change to the second TD-BWP.

In some aspects, to determine that the parameter associated with the UE traffic meets the condition, the processor is configured to receive, using the transceiver, a message from the UE during a prescheduled uplink grant and examine one or more bytes within the message. In response to the one or more bytes indicating a request for a change of the first TD-BWP, the processor is configured to determine that the parameter associated with the UE traffic meets the condition.

In some aspects, the one or more bytes indicating the request for the change of the first TD-BWP are based on a traffic type associated with the UE traffic. In some aspects, the one or more bytes indicating the request for the change of the first TD-BWP are based on a block error rate (BLER) associated with the UE traffic or a number of retransmission associated with the UE traffic.

In some aspects, to determine that the parameter associated with the UE traffic meets the condition, the processor is configured to determine a signal to interference and noise ratio (SINR) value and compare the SINR value to a threshold. In response to the SINR value being less than the threshold, the processor is configured to determine that the parameter associated with the UE traffic meets the condition. In some aspects, the processor is configured to receive, using the transceiver, a message from the UE indicating the SINR value. Additionally, or alternatively, the processor is configured to measure the SINR value for one or more uplink transmission from the UE.

In some aspects, to determine that the parameter associated with the UE traffic meets the condition, the processor is configured to determine hybrid automatic repeat request (HARQ) acknowledgment (ACK) information or HARQ NACK information and compare the HARQ ACK information or the HARQ NACK information to a threshold. In response to the HARQ ACK information or the HARQ NACK information being less than the threshold, the processor is configured to determine that the parameter associated with the UE traffic meets the condition.

In some aspects, to determine that the parameter associated with the UE traffic meets the condition, the processor is configured to receive, using the transceiver, a channel state information (CSI) message from the UE, the CSI message including downlink channel information. The processor is further configured to compare the downlink channel quality information to one or more thresholds. In response to the downlink channel quality information satisfying the one or more thresholds, the processor is further configured to determine that the parameter associated with the UE traffic meets the condition.

In some aspects, to determine that the parameter associated with the UE traffic meets the condition, the processor is configured to receive, using the transceiver, a sounding reference signal (SRS) message from the UE, the SRS message including uplink channel quality information. The processor is further configured to compare the uplink channel quality information to one or more thresholds. In response to the uplink channel quality information satisfying the one or more thresholds, the processor is further configured to determine that the parameter associated with the UE traffic meets the condition.

Some aspects of this disclosure relate to a method including determining, by a base station in communication with a user equipment (UE), whether a parameter associated with UE traffic meets a condition. The UE operates at a first time domain bandwidth part (TD-BWP). The method further includes changing the first TD-BWP to a second TD-BWP to be used by the UE in response to determining that the parameter meets the condition and transmitting a downlink control information (DCI) message to the UE indicating the change to the second TD-BWP.

Some aspects of this disclosure relate to a non-transitory computer-readable medium storing instructions. When the instructions are executed by a processor of a base station in communication with a user equipment (UE) the instructions cause the base station to perform operations including determining whether a parameter associated with UE traffic meets a condition. The UE operates at a first time domain bandwidth part (TD-BWP). The operations further includes changing the first TD-BWP to a second TD-BWP to be used by the UE in response to determining that the parameter meets the condition and transmitting a downlink control information (DCI) message to the UE indicating the change to the second TD-BWP.

Some aspects of this disclosure relate to a user equipment (UE). The UE includes a transceiver configured to enable wireless communication with a base station and a processor communicatively coupled to the transceiver. The processor is configured to transmit, using the transceiver, a first message to the base station during a prescheduled uplink grant in response to determining that a parameter associated with UE traffic meets a condition. The UE operates at a first time domain bandwidth part (TD-BWP) and the message indicates a request for a change of the first TD-BWP. The processor is further configured to receive, using the transceiver, a second message from the base station and change the first TD-BWP to a second TD-BWP based on the received message.

Some aspects of this disclosure relate to a method including transmitting, by a user equipment (UE), a first message to a base station during a prescheduled uplink grant in response to determining that a parameter associated with UE traffic meets a condition. The UE operates at a first time domain bandwidth part (TD-BWP) and the message indicates a request for a change of the first TD-BWP. The method further includes receiving a second message from the base station and changing the first TD-BWP to a second TD-BWP based on the received message.

Some aspects of this disclosure relate to a non-transitory computer-readable medium storing instructions. When the instructions are executed by a processor of a user equipment (UE) the instructions cause the UE to perform operations including transmitting a first message to a base station during a prescheduled uplink grant in response to determining that a parameter associated with UE traffic meets a condition. The UE operates at a first time domain bandwidth part (TD-BWP) and the message indicates a request for a change of the first TD-BWP. The operations further include receiving a second message from the base station and changing the first TD-BWP to a second TD-BWP based on the received message.

This Summary is provided merely for purposes of illustrating some aspects to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings, which are incorporated herein and form part of the specification, illustrate the present disclosure and, together with the description, further serve to explain the principles of the disclosure and enable a person of skill in the relevant art(s) to make and use the disclosure.

Figure 1:
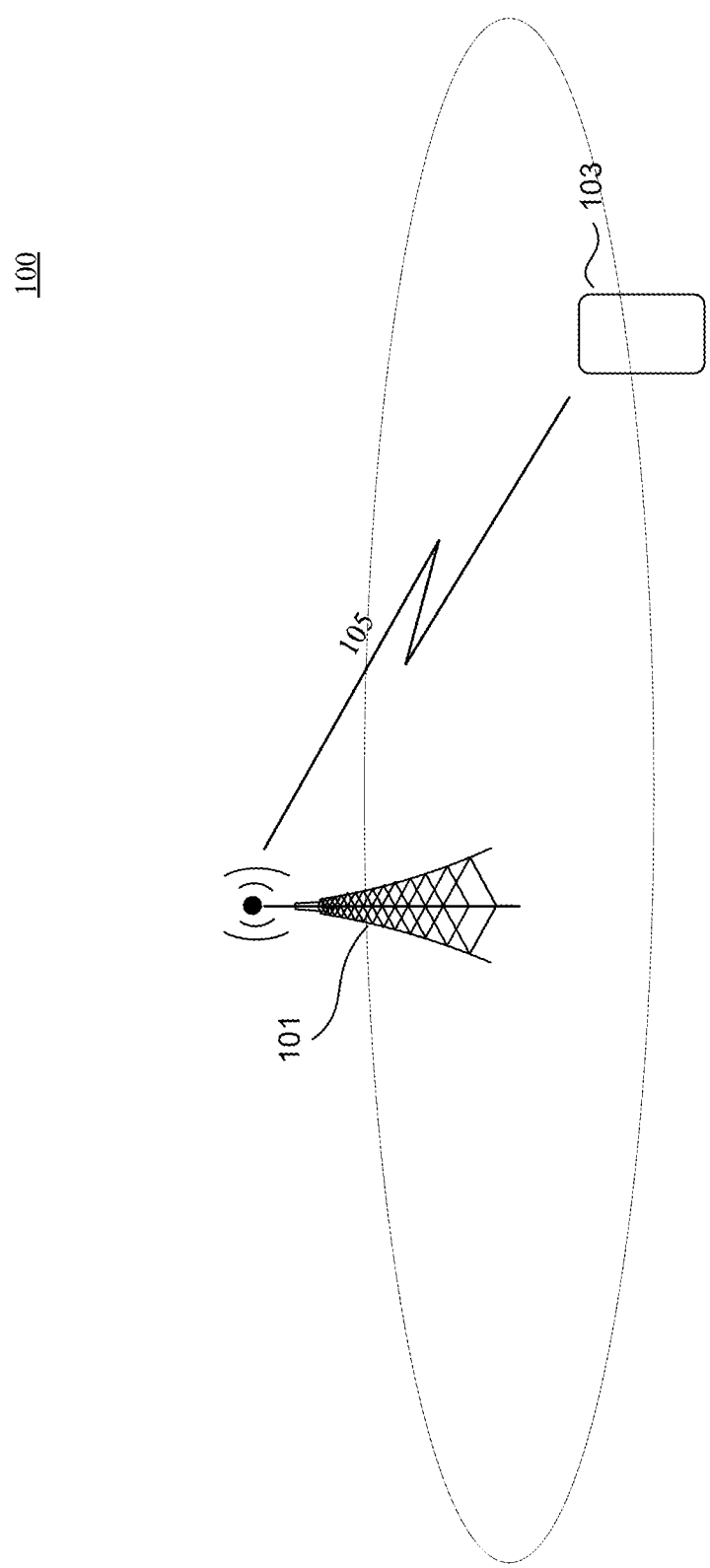
FIG. 1 illustrates an example system implementing TD-BWP switch, according to some aspects of the disclosure.

The present disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Some aspects of this disclosure relate to apparatuses and methods for implementing the TD-BWP switch for balancing between the UE power consumption and a latency of the UE. For example, some aspects of this disclosure relate to apparatuses and methods for implementing mechanisms the TD-BWP switch based on the UE triggering padded transport block (TB) based on a number of retransmissions, a block error rate (BLER), and/or a traffic type. Additionally, or alternatively, some aspects of this disclosure relate to apparatuses and methods for implementing mechanisms the TD-BWP switch based on the UE transmitting predetermined message(s) to the network. Additionally, or alternatively, some aspects of this disclosure relate to apparatuses and methods for implementing mechanisms the TD-BWP switch based on additional measurements performed by the UE and/or the network.

In some examples, the aspects of this disclosure can be performed by a network and/or a UE that operates according to $5^{th}$ generation (5G) wireless technology for digital cellular networks as defined by 3rd Generation Partnership Project (3GPP). Additionally, or alternatively, the aspects of this disclosure can be performed by a network and/or a UE that operates according to the Release 15 (Rel-15), Release 16 (Rel-16), Release 17 (Rel-17), Rel-17 new radio (NR), or others. However, the aspects of this disclosure are not limited to these examples, and one or more mechanisms of this disclosure can be implemented by other network(s) and/or UE(s) for TD-BWP switch.

FIG. 1 illustrates an example system 100 implementing TD-BWP switch, according to some aspects of the disclosure. Example system 100 is provided for the purpose of illustration only and does not limit the disclosed aspects.

System 100 may include, but is not limited to, a network node (for example, a base station such as eNBs, gNBs, and the like) 101 and an electronic device (for example, a UE) 103. The electronic device 103 (hereinafter referred to as UE 103) can be configured to operate based on a wide variety of wireless communication techniques. These techniques can include, but are not limited to, techniques based on 3rd Generation Partnership Project (3GPP) standards. For example, the UE 103 can be configured to operate using Rel-15, Rel-16, Rel-17 or other. The UE 103 can include, but is not limited to, wireless communication devices, smart phones, laptops, desktops, tablets, personal assistants, monitors, televisions, wearable devices, Internet of Things (IoTs), vehicle's communication devices, and the like. The network node 101 (herein referred to as a base station or a cell) can include one or more nodes configured to operate based on a wide variety of wireless communication techniques such as, but not limited to, techniques based on 3GPP standards. For example, the base station 101 can include one or more nodes configured to operate using Rel-15, Rel-16, Rel-17 or others.

According to some aspects, the UE 103 can be connected to and can communicate with the base station 101 using a carrier 105. According to some aspects, the carrier 105 can include one carrier. Additionally, or alternatively, the carrier 105 can include two or more component carriers (CC). In other words, the UE 103 can implement carrier aggregation (CA). For example, the UE 103 can use multiple carriers for communication with the base station 101.

According to some aspects, the base station 101 can define two or more TD-BWP for the UE 103 to use to, for example, receive downlink (DL) data/control and/or to transmit uplink (UL) data/control. Some aspects of this disclosure are discuss with respect to two TD-BWP—BWP #1 and BWP #2. However, the aspects of this disclosure are not limited to these examples and other number of TD-BWP can be used. According to some implementations, the BWP #1 can be used when data activity is high and the BWP #2 can be used when the data activity is low (or there is no data activity). For example, the BWP #1 can be used for dense Physical Downlink Control Channel (PDCCH) monitoring occasions. The BWP #2 can be used for sparse PDCCH monitoring occasions.

According to some aspects, for the BWP #2, the UE 103 does not receive data and/or control information or does not transmit data and/or control information in every slot. But the UE 103 receives data and/or control information or transmits data and/or control information every $n^{th}$ slot, where n is a positive integer greater than 2. For example, the UE 103 receives data and/or control information or transmits data and/or control information every $4^{th}$ slot. In some examples, in the sparse PDCCH monitoring of BWP #2, the PDCCH is not scheduled in every slot but is scheduled every $n^{th}$ slot.

According to some aspects, for the BWP #1, the UE 103 receives data and/or control information or transmits data and/or control information in every slot. In some examples, in the dense PDCCH monitoring of BWP #1, the PDCCH is scheduled in every slot.

According to some aspects, the two TD-BWPs (BWP #1 and BWP #2) fully overlap in terms of bandwidth, center frequency, subcarrier spacing (SCS), and the like. In some implementations, there are radio resource control (RRC) physical (PHY) related configuration parameter differences between the two TD-BWPs. According to some aspects, a first RRC configuration can be used for BWP #1 and a second RRC configuration can be used for BWP #2, where the first and second RRC configurations are different. The base station 101 can provide the two RRC configurations to the UE 103 at an initial establishment of the RRC connection between the UE 103 and the base station 101. In some examples, one of the TD-BWPs is latent and the other one is actively running in the UE 103. For example, the UE 103 can be configured for BWP #1 at the initial establishment of the RRC connection.

Additionally, or alternatively, similar methods can be used to configure the TD-BWP at the UE 103 during RRC reconfiguration.

According to some aspects, the base station 101 is configured to change the TD-BWP at the UE 103. For example, the base station 101 can use a message (such as, but not limited to, a downlink control information (DCI) message) to switch the TD-BWP at the UE 103. For example, if the UE 103 is operating using BWP #1, the base station 101 can send the message to the UE 103 to switch to BWP #2. The UE 103 can activate BWP #2 and can make BWP #1 inactive. In another example, if the UE 103 is operating using BWP #2, the base station 101 can send the message to the UE 103 to switch to BWP #1. The UE 103 can activate BWP #1 and can make BWP #2 inactive. As noted above, although some aspects of this disclosure are discussed with respect to two TD-BWPs, the aspects of this disclosure can use any number of TD-BWPs.

In some examples, the BWP with sparse search space (BWP #2) can be configured as a type3-PDCCH-CSS (CSS=common search space) with RRC information element (IE) SearchSpace in PDCCH-Config with searchSpaceType=common for DCI format 0 and DCI format 1_0 with cyclic redundancy check (CRC) scrambled by the C-NTI. In some implementations, the monitoring slot periodicity can be 4 slots. According to some examples, the DCI message for the switch can be included in a DL DCI message, and the switchingDelay can be based on Type 2 requirements in table 8.6.2-1 in 3GPP 38.133.

According to some aspects, the DCI message with switch will include a DCI1, but the corresponding Physical Downlink Shared Channel (PDSCH) slot (e.g., k0 slots later) will not have PDSCH scheduling so it will lead to a NACK hybrid automatic repeat request (HARQ) response (if DCI message is detected by the UE 103). This NACK will not lead to retransmissions by the base station 101, according to some aspects. If instead the DCI message for the TD-BWP switch leads to a DTX in the base station 101, then the DCI message is retransmitted until the NACK been received, according to some aspects. In some implementations, the time to trigger the DCI message for the TD-BWP switch can be controlled by the base station 101 based on, for example, the user data thresholds both in DL and UL.

According to some aspects, the base station 101 can trigger the switch between the TD-BWPs based on the amount of data in one slot of one transmission time interval (TTI). The base station 101 can monitor the amount of data in the slots, determine whether a condition for TD-BWP switch is met, and then send a message to the UE 103 to switch its TD-BWP if the condition is met. According to some implementations, the base station 101 can trigger a down switch of TD-BWP (e.g., from BWP #1 to BWP #2) if the transport block (TB) size is less than a threshold of slot capacity continuously for a predetermined time period at every TTI. In a non-limiting example, the threshold can be 10% and the predetermined time period can be 200 ms. However, the aspects of this disclosure are not limited to these examples and other thresholds and predetermined time periods can be used. According to some implementations, the base station 101 can trigger an up switch of TD-BWP (e.g., from BWP #2 to BWP #1) if the TB size is 100% of slot capacity for one TTI. Other conditions and/or thresholds can be used for the down switch and/or the up switch.

Additionally, or alternatively, other methods can be used for the TD-BWP switch for balancing between the UE power consumption and latency of the UE 103. For example, some aspects of this disclosure relate to apparatuses and methods for implementing mechanisms the TD-BWP switch based on the UE 103 triggering padded TB based on a number of retransmissions, a block error rate (BLER), and/or a traffic type. For example, the UE 103 can measure and determine a number of retransmissions associated with the UE 103 traffic. The traffic can be an UL traffic to the base station 101. The UE 103 can compare the number of retransmissions with a retransmission threshold. If the number of retransmissions is greater than the retransmission threshold, the UE 103 can trigger the base station 101 to trigger the TD-BWP up switch. For example, the UE 103 can add a plurality of padding bits to TB to reach a predetermined slot capacity for TTI. In some examples, the predetermined slot capacity for TTI can include a maximum slot capacity for TTI. Alternatively, the predetermined slot capacity for TTI can include 95% capacity. In some examples, the predetermined slot capacity for TTI can include 90% capacity, or some other slot capacity. The aspects of this disclosure are not limited to these examples, and the predetermined slot capacity for TTI can include other capacity values. By sending the TB to the base station 101, the base station 101 can trigger the TD-BWP up switch by sending a message to the UE, such as a DCI message to the UE 103.

In some implementations, the UE 103 can measure and determine the BLER associated with the UE 103 traffic. The traffic can be an UL traffic to the base station 101. The UE 103 can compare the BLER with a BLER threshold. If the BLER is greater than the BLER threshold, the UE 103 can trigger the base station 101 to trigger the TD-BWP up switch. For example, the UE 103 can add a plurality of padding bits to TB to reach the predetermined (e.g., the maximum) slot capacity for TTI. By sending the TB to the base station 101, the base station 101 can trigger the TD-BWP up switch by sending a message to the UE, such as a DCI message to the UE 103.

In some implementations, the UE 103 can determine a traffic type associated with the UE 103 traffic. The traffic can be UL traffic to the base station 101. The UE 103 can compare the traffic type with a plurality of traffic types. If the traffic type is in the plurality of traffic types, the UE 103 can trigger the base station 101 to trigger the TD-BWP up switch. For example, the UE 103 can add a plurality of padding bits to TB to reach the predetermined (e.g., the maximum) slot capacity for TTI. By sending the TB to the base station 101, the base station 101 can trigger the TD-BWP up switch by sending a message to the UE, such as a DCI message to the UE 103.

According to some implementation, after the switch, the UE 103 can stay in the new TD-BWP (e.g., BWP #1) for a predetermined time period. For example, the UE 103 can have a timer to measure the predetermined time period. During this time, the UE 103 can keep sending TBs with the padding bits to stay in the new TD-BWP. After the timer expires, the UE may stop adding the padding bits and it may be switched back to the prior TD-BWP (e.g., BWP #2) by the base station 101.

According to some implementation, the UE 103 may switch a number of times between the two TD-BWPs (or any other number of TD-BWPs). In some aspects, the base station 101 can be configured to control the number of times that the UE 103 switches between the two TD-BWPs. For example, the base station 101 can include a counter to measure the number of UE 103 TD-BWP switches within a predetermined time period or an RRC connection duration. If the number of UE 103 TD-BWP switches within the predetermined time period or the RRC connection duration is greater than a threshold, then the base station 101 may stop triggering the UE 103 to switch between the TD-BWPs. For example, if the number of UE 103 TD-BWP switches within the predetermined time period or the RRC connection duration is greater than the threshold, the base station 101 will refrain from sending the message (e.g., the DCI message) for triggering the UE 103 to switch TD-BWP. This can help in avoiding unnecessary TD-BWP switching.

Additionally, or alternatively, some aspects of this disclosure relate to apparatuses and methods for implementing mechanisms the TD-BWP switch based on the UE transmitting predetermined message(s) to the network. For example, the UE 103 can use preschedule uplink grants to transmit a predetermine message to the base station 101 to trigger the base station 101 to switch the TD-BWP for the UE 103. In some implementations, the UE 103 has prescheduled uplink grants for a period of time even though the UE 103 may have no UL packets to transmit to the base station 101. The UE 103 can use these prescheduled uplink grants to send the predetermined message to the base station for the TD-BWP switch. In these implementations, the predetermined message can be used instead and/or in addition to the padding bit discussed above. The predetermined message can include one or more predetermined bits and/or bytes to trigger a TD-BWP switch, according to some aspects.

For example, the UE 103 can measure and determine a number of retransmissions associated with the UE 103 traffic. The traffic can be UL traffic to the base station 101. The UE 103 can compare the number of retransmissions with the retransmission threshold. If the number of retransmissions is greater than the retransmission threshold, the UE 103 can trigger the base station 101 to trigger the TD-BWP up switch. For example, the UE 103 can transmit the predetermined message to the base station 101. By sending the predetermined message to the base station 101, the base station 101 can trigger the TD-BWP up switch by sending a message such as a DCI message to the UE 103. Additionally, or alternatively, by sending the predetermined message, the UE 103 can request that the base station 101 not to down switch the TD-BWP (e.g., from TD-BWP #1 to TD-BWP #2) if the UE 103 is operating on, for example, TD-BWP #1.

In some implementations, the UE 103 can measure and determine the BLER associated with the UE 103 traffic. The traffic can be UL traffic to the base station 101. The UE 103 can compare the BLER with the BLER threshold. If the BLER is greater than the BLER threshold, the UE 103 can trigger the base station 101 to trigger the TD-BWP up switch. For example, the UE 103 can transmit the predetermined message to the base station 101. By sending the predetermined message to the base station 101, the base station 101 can trigger the TD-BWP up switch by sending a message such as a DCI message to the UE 103. Additionally, or alternatively, by sending the predetermined message, the UE 103 can request that the base station 101 not to down switch the TD-BWP (e.g., from TD-BWP #1 to TD-BWP #2) if the UE 103 is operating on, for example, TD-BWP #1.

In some implementations, the UE 103 can determine a traffic type associated with the UE 103 traffic. The traffic can be UL traffic to the base station 101. The UE 103 can compare the traffic type with the plurality of traffic types. If the traffic type is in the plurality of traffic types, the UE 103 can trigger the base station 101 to trigger the TD-BWP up switch. For example, the UE 103 transmit the predetermined message to the base station. By sending the predetermined message to the base station 101, the base station 101 can trigger the TD-BWP up switch by sending a message such as a DCI message to the UE 103. Additionally, or alternatively, by sending the predetermined message, the UE 103 can request that the base station 101 not down switch the TD-BWP (e.g., from TD-BWP #1 to TD-BWP #2) if the UE 103 is operating on, for example, TD-BWP #1.

Additionally, or alternatively, some aspects of this disclosure relate to apparatuses and methods for implementing mechanisms the TD-BWP switch based on additional measurements performed by the UE and/or the network. In some aspects, the base station 101 can use other parameters in addition to, or instead of, the TB size to make the TD-BWP switch. In some implementations, the base station 101 can receive these additional parameters from the UE 103 (and/or other UEs such as a device under test (DUT)). Additionally, or alternatively, the base station 101 can measure or determine these additional parameters itself.

In some implementations, the base station 101 can use a signal to interference and noise ratio (SINR) value to determine whether or not to make the TD-BWP switch. For example, the base station 101 can determine the SINR value, compare the SINR value to a SINR threshold, and in response to the SINR value being less than the SINR threshold, the base station 101 can determine to make the TD-BWP up switch. Otherwise, the base station 101 does not trigger the TD-BWP up switch. In some examples, the base station 101 can receive the SINR value from the UE 103 and/or other UEs. In some examples, the base station can measure the SINR value for one or more uplink transmission from the UE.

In some implementations, the base station 101 can use hybrid automatic repeat request (HARQ) acknowledgment (ACK) information or HARQ NACK information to determine whether or not to make the TD-BWP switch. For example, the base station 101 can determined the HARQ ACK/NACK information and compare the determined information with a HARQ threshold. In response to the HARQ ACK/NACK information being less than the HARQ threshold, the base station 101 can determine to make the TD-BWP up switch. Otherwise, the base station 101 does not trigger the TD-BWP up switch. In some examples, the base station 101 can receive the HARQ ACK/NACK information from the UE 103 and/or other UEs. In some examples, the base station can determine the HARQ ACK/NACK information for one or more downlink transmission from the UE.

In some implementations, the base station 101 can use a channel state information (CSI) message from the UE 103 to determine whether or not to make the TD-BWP switch. The CSI message can include downlink channel information. For example, the base station 101 can receive the CSI message from the UE 103 and compare the downlink channel quality information in the CSI message to one or more downlink channel quality thresholds. In response to the downlink channel quality information satisfying the one or more downlink channel quality thresholds, the base station can determine to make the TD-BWP up switch. Otherwise, the base station 101 does not trigger the TD-BWP switch.

In some implementations, the base station 101 can use a sounding reference signal (SRS) message from the UE 103 to determine whether or not to make the TD-BWP switch. The SRS message can include uplink channel quality information. For example, the base station 101 can receive the SRS from the UE 103 and compare the uplink channel quality information in the SRS to one or more uplink channel quality thresholds. In response to the uplink channel quality information satisfying the one or more uplink channel quality thresholds, the base station 101 can determine to make the TD-BWP switch. Otherwise, the base station 101 does not trigger the TD-BWP switch.

According to some aspects, the base station 101 can use the SINR value and/or the SRS message for determining whether to trigger the TD-BWP switch when UL BLER exceeds the BLER threshold. According to some aspects, the base station 101 can use the CSI and/or the HARQ ACK/NACK information for determining whether to trigger the TD-BWP switch when DL BLER exceeds the BLER threshold.

Figure 2:
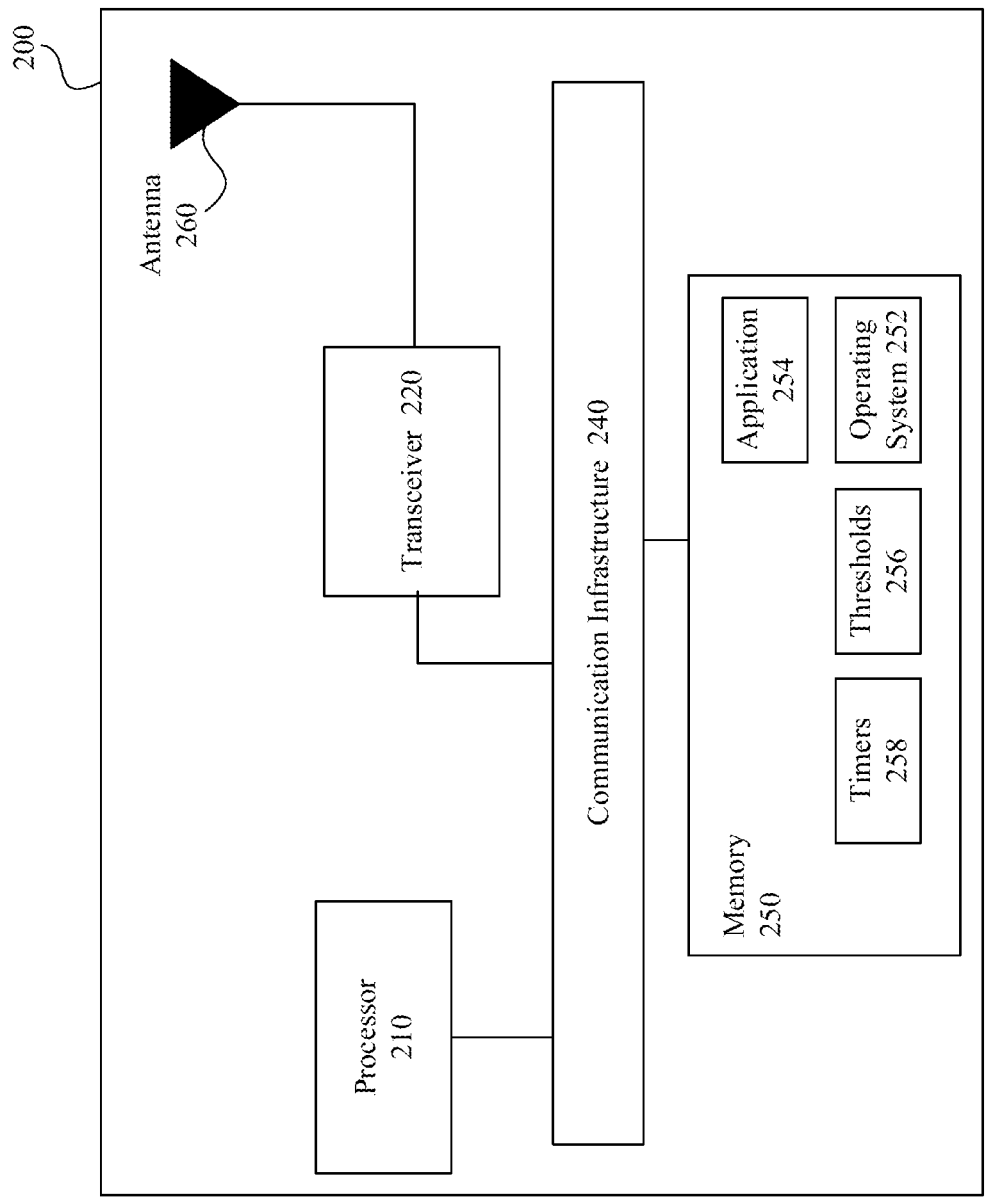
FIG. 2 illustrates a block diagram of an example system of an electronic device implementing TD-BWP switch, according to some aspects of the disclosure.

FIG. 2 illustrates a block diagram of an example system 200 of an electronic device implementing TD-BWP switch, according to some aspects of the disclosure. System 200 may be any of the electronic devices (e.g., base station 101, UE 103) of system 100. System 200 includes a processor 210, one or more transceivers 220, a communication infrastructure 240, a memory 250, operating system 252, application 254, thresholds 256, timers 258, and/or an antenna 260. Illustrated systems are provided as exemplary parts of system 200, and system 200 can include other circuit(s) and subsystem(s). Also, although the systems of system 200 are illustrated as separate components, the aspects of this disclosure can include any combination of these, less, or more components. Also, system 200 of the aspects of this disclosure can include any number of processors, transceivers, communication infrastructures, memories, operating systems, applications, and antennas.

The memory 250 may include random access memory (RAM) and/or cache, and may include control logic (e.g., computer software) and/or data. The memory 250 may include other storage devices or memory such as, but not limited to, a hard disk drive and/or a removable storage device/unit. According to some examples, the operating system 252 can be stored in memory 250. The operating system 252 can manage transfer of data between the memory 250, one or more applications 254, the processor 210, and/or one or more transceivers 220. In some examples, the operating system 252 maintains one or more network protocol stacks (e.g., Internet protocol stack, cellular protocol stack, and the like) that can include a number of logical layers. At corresponding layers of the protocol stack, the operating system 252 includes control mechanism and data structures to perform the functions associated with that layer.

According to some examples, the application 254 can be stored in the memory 250. The application 254 can include applications (e.g., user applications) used by wireless system 200 and/or a user of wireless system 200. The applications in the application 254 can include applications such as, but not limited to, radio streaming, video streaming, remote control, and/or other user applications.

According to some aspects, the memory 250 can store different thresholds 256. The thresholds 256 can include, but are not limited to, the BLER threshold, the retransmission threshold, SINR threshold, HARQ threshold, DL channel quality threshold, UL channel quality threshold, or the like. The memory 250 can store timers 258. The timers 258 can include timers and/or counters discussed herein. However, the aspects of this disclosure are not limited to these examples and the memory 250 can include other thresholds, timers, and/or counters.

System 200 can also include the communication infrastructure 240. The communication infrastructure 240 provides communication between, for example, the processor 210, the one or more transceivers 220, and the memory 250. In some implementations, the communication infrastructure 240 may be a bus. The processor 210 together with instructions stored in memory 250 performs operations enabling system 200 of system 100 to implement a TD-BWP switch, as described herein.

The one or more transceivers 220 transmit and receive communications signals that support the operations of system 200 including, but not limited to, TD-BWP switch, according to some aspects, and may be coupled to the antenna 260. The antenna 260 may include one or more antennas that may be the same or different types. The one or more transceivers 220 allow system 200 to communicate with other devices that may be wired and/or wireless. In some examples, the one or more transceivers 220 can include processors, controllers, radios, sockets, plugs, buffers, and like circuits/devices used for connecting to and communication on networks. According to some examples, the one or more transceivers 220 include one or more circuits to connect to and communicate on wired and/or wireless networks.

According to some aspects, the one or more transceivers 220 can include a cellular subsystem, a WLAN subsystem, and/or a Bluetooth™ subsystem, each including its own radio transceiver and protocol(s) as will be understood by those skilled arts based on the discussion provided herein. In some implementations, the one or more transceivers 220 can include more or fewer systems for communicating with other devices.

In some examples, the one or more transceivers 220 can include one or more circuits (including a WLAN transceiver) to enable connection(s) and communication over WLAN networks such as, but not limited to, networks based on standards described in IEEE 802.11. Additionally, or alternatively, the one or more transceivers 220 can include one or more circuits (including a Bluetooth™ transceiver) to enable connection(s) and communication based on, for example, Bluetooth™ protocol, the Bluetooth™ Low Energy protocol, or the Bluetooth™ Low Energy Long Range protocol. For example, transceiver 220*n* can include a Bluetooth™ transceiver.

Additionally, the one or more transceivers 220 can include one or more circuits (including a cellular transceiver) for connecting to and communicating on cellular networks. The cellular networks can include, but are not limited to, 3G/4G/5G networks such as Universal Mobile Telecommunications System (UMTS), Long-Term Evolution (LTE), and the like. For example, the one or more transceivers 220*a*-220*n* can be configured to operate according to one or more of Rel-15, Rel-16, Rel-17, or other of the 3GPP standards.

According to some aspects, the processor 210, alone or in combination with computer instructions stored within the memory 250, and/or the one or more transceiver 220, implements TD-BWP switch, as discussed herein.

Figure 3:
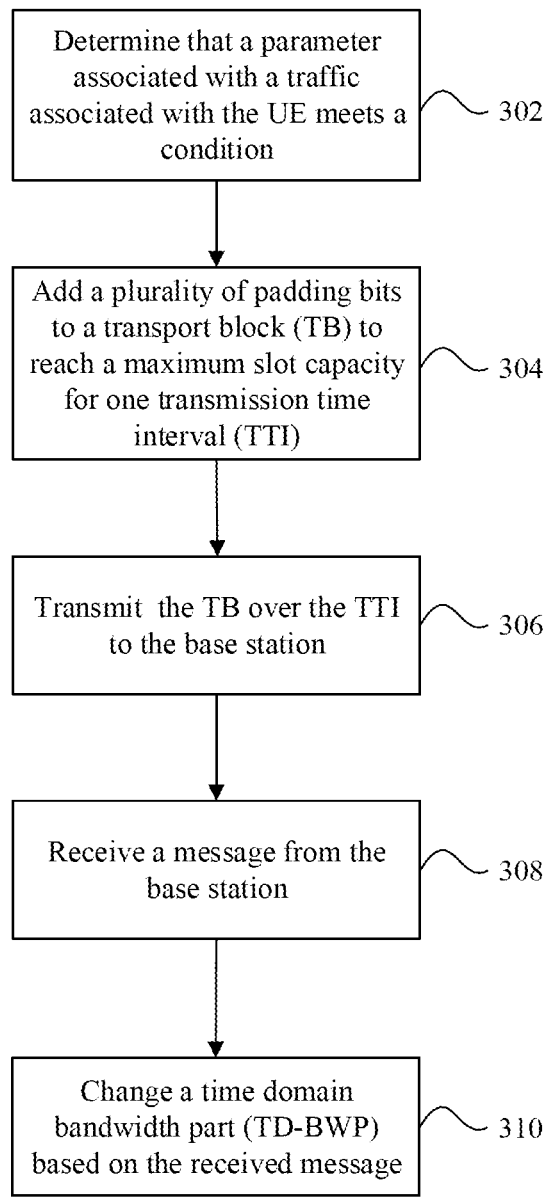
FIG. 3 illustrates an example method for a system (for example, a UE) performing TD-BWP switching by triggering padded transport block (TB), according to some aspects of the disclosure.

FIG. 3 illustrates an example method 300 for a system (for example, a UE) performing TD-BWP switching by generating a padded transport block (TB), according to some aspects of the disclosure. As a convenience and not a limitation, FIG. 3 may be described with regard to elements of FIGS. 1-2. Method 300 may represent the operation of an electronic device (for example, UE 103 of FIG. 1) implementing the TD-BWP switch. Method 300 may also be performed by system 200 of FIG. 2 and/or computer system 700 of FIG. 7. But method 300 is not limited to the specific aspects depicted in those figures and other systems may be used to perform the method as will be understood by those skilled in the art. It is to be appreciated that not all operations may be needed, and the operations may not be performed in the same order as shown in FIG. 3.

According to some aspects, method 300 is performed if both the network (e.g., the base station 101) and the UE (e.g., the UE 103) support TD-BWP switching. If either the UE or the network does not support TD-BWP switching, then method 300 is not performed. Method 300 is discussed with respect to two TD-BWPs (BWP #1 and BWP #2). However, method 300 is not limited to these two TD-BWPs and can include any number of BWPs. For example, the aspects of this disclosure can include switching between any number of TD-BWPs.

According to some aspects, the UE operating method 300 is operating using BWP #2 (e.g., a BWP for when the data activity is low (or there is no data activity)). At 302, a determination is made that a parameter associated with a traffic associated with the UE meets a condition. For example, the UE can determine whether the parameter associated with the UE traffic meets the condition. If the parameter meets the condition, method 300 moves to 304. However, if the parameter does not meet the condition, method 300 can stay at 302 to periodically check whether the condition is met or not.

According to some aspects, to determine that the parameter associated with the UE traffic meets the condition, the UE can measure a BLER associated with the traffic and compare the BLER with a BLER threshold. In response to the BLER exceeding the BLER threshold, the UE determines that the parameter meets the condition. If the BLER is less than or equal to the BLER threshold, the UE determines that the parameter does not meet the condition.

According to some aspects, to determine that the parameter associated with the UE traffic meets the condition, the UE can measure a number of retransmissions associated with the traffic and compare the number of retransmissions with a retransmission threshold. In response to the number of retransmissions exceeding the retransmissions threshold, the UE can determine that the parameter associated with the UE traffic meets the condition. If the number of retransmissions is less than or equal to the retransmissions threshold, the UE can determine that the parameter associated with the UE traffic does not meet the condition.

According to some aspects, to determine that the parameter associated with the traffic associated with the UE meets the condition, the UE can determine a traffic type associated with the traffic and compare the traffic type with a plurality of traffic types. For example, the plurality of traffic types can be stored in the memory 250 of FIG. 2. In response to the traffic type being one of the plurality of traffic types, the UE can determine that the parameter associated with the UE traffic meets the condition. If the traffic type is not one of the plurality of traffic types, the UE can determine that the parameter associated with the UE traffic does not meet the condition. In some implementations, the plurality of traffic types for which the UE can trigger the up switch can include, but are not limited to, traffic types associated with Voice over Long Term Evolution (VoLTE), Voice over New Radio (VoNR), Voice over 5G (Vo5g), radio streaming, video streaming, video game, video call, or the like. According to some aspects, operation 302 can further include the UE receiving the traffic from, for example, the UE higher layers. The UE can then examine the traffic to determine the traffic type. For example, the UE can examine one or more bits in the traffic data to determine the traffic type. Then, the UE can compare the determined traffic type with the plurality of traffic types. The aspects of this disclosure are not limited to these examples, the UE can use other methods to determine the traffic type associated with the UE traffic.

In response to determining that the parameter associated with the UE traffic meets the condition, at 304 a plurality of padding bits are added to a transport block (TB) to reach a maximum slot capacity for one transmission time interval (TTI). Alternatively, the plurality of padding bits are added to the TB to reach a predetermined slot capacity of one TTI, e.g. 95%, 90%, 85%, or the like capacity.

At 306, the TB is transmitted over the TTI to the base station. For example, the UE transmits the TB that includes the plurality of padding bits to the base station. The transmitted TB can trigger the base station to switch the BWP based on the number of total bits, including padding bits, in the TTI. According to some aspects, the switch can be an up switch (e.g., from BWP #2 to BWP #1). In some implementations when more than two TD-BWPs are used, the up switch can be to the next BWP used for higher data activity than the current BWP.

At 308, a message is received from the base station. For example, the UE receives the message from the base station. According to some aspects, the message triggers the UE to switch the TD-BWP that the UE is using. According to some implementations, the message can include a DCI message.

At 310, the UE changes the TD-BWP on which the UE is operating based on the received message. For example, the UE can change its TD-BWP from BWP #2 to BWP #1 that can be used for higher data activity. According to some aspects, for the BWP #1, the UE receives data and/or control information or transmits data and/or control information in every slot.

According to some aspects, method 300 can repeat for a predetermined number of times. Additionally, or alternatively, the UE can operate at the up switched BWP (e.g., BWP #1) for the predetermined time period. In some implementations, the predetermined time period can include the duration of the traffic with the traffic type determined in 302 that resulted in the up switch. In some examples, the UE can determine the duration of the traffic by examining the UE traffic. For example, the traffic data can include one or more bits indicating the duration of the UE traffic. By examining the one or more bits, the UE can determine the duration. After the predetermined time period, the UE can down switch to another BWP (e.g., to BWP #2). In some aspects, the UE can stop adding padding bits to the TB to trigger the down switch. In these examples, method 300 can move back to operation 302 to determine whether a second parameter associated with the UE traffic meets a second condition. The UE can perform operations 304-310 if the second condition is met.

According to some aspects, the second parameter can be one of the BLER, the number of retransmission, or the traffic type. The second condition can be the BLER threshold, the retransmission threshold, or the plurality of traffic types. The second parameter can be the same as the parameter used in the first iteration of method 300. Alternatively, the second parameter can be different from the parameter used in the first iteration of method 300.

Figure 4:
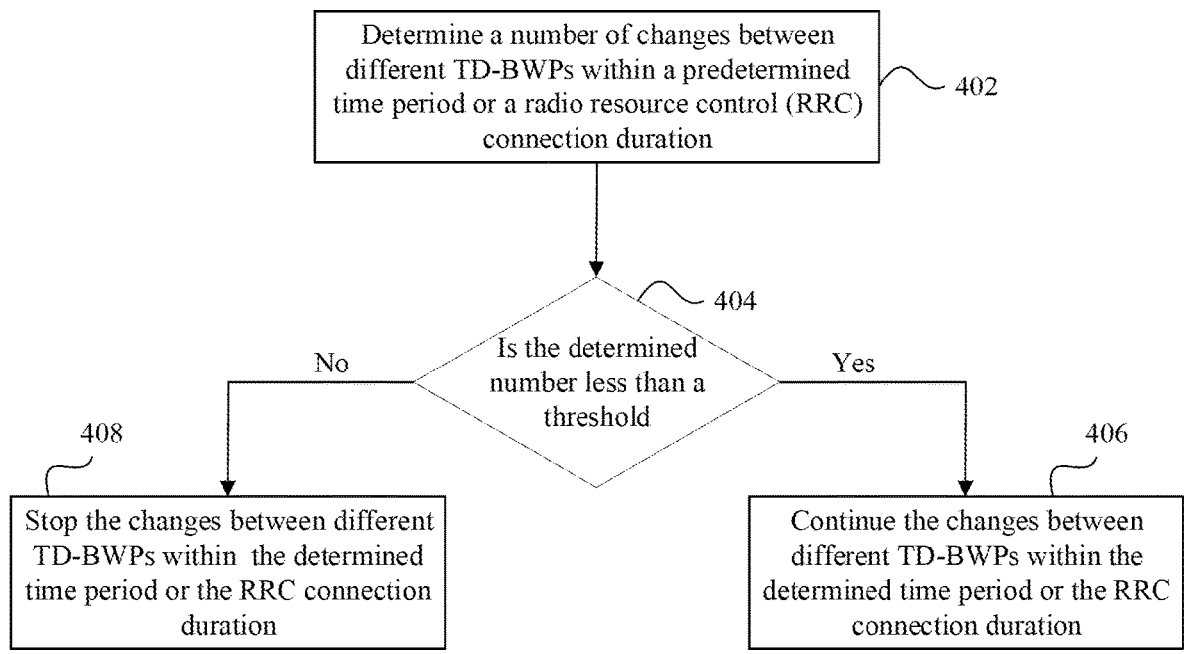
FIG. 4 illustrates an example method for a system (for example, a base station) monitoring the number of TD-BWP switches, according to some aspects of the disclosure.

FIG. 4 illustrates an example method 400 for a system (for example, a base station) monitoring the number of TD-BWP switches, according to some aspects of the disclosure. As a convenience and not a limitation, FIG. 4 may be described with regard to elements of FIGS. 1-3. Method 400 may represent the operation of an electronic device (for example, base station 101 of FIG. 1) monitoring the number of TD-BWP switches. Method 400 may also be performed by system 200 of FIG. 2 and/or computer system 700 of FIG. 7. But method 400 is not limited to the specific aspects depicted in those figures and other systems may be used to perform the method as will be understood by those skilled in the art. It is to be appreciated that not all operations may be needed, and the operations may not be performed in the same order as shown in FIG. 4.

At 402, a number of changes between different TD-BWPs within a predetermined time period or a radio resource control (RRC) connection duration is determined. For example, the base station can monitor the number of times the UE changes between different TD-BWPs. The base station can monitor the number of times the UE changes between different TD-BWPs during the predetermined time period. For example, the base station can use the timers 258 to count the number of TD-BWP switches and can use the timers 258 to measure the predetermined time period.

At 404, the determined number of TD-BWP switches are compared with a threshold. In some examples, the threshold can be stored in memory 250 of FIG. 2 as threshold 256. If the determined number of TD-BWP switches is less than the threshold, method 400 continues at 406 where the changes between different TD-BWPs within the predetermined time period or the RRC connection duration are continued. In other words, the base station will continue to trigger the UE to switch between TD-BWPs if the determined number of TD-BWP switches (within the predetermined time period) is less than the threshold.

However, if the determined number of TD-BWP switches is greater than or equal to the threshold, method 400 continues at 408 where the changes between different TD-BWPs within the predetermined time period or the RRC connection duration are stopped. In other words, the base station will stop triggering the UE to switch between TD-BWPs if the determined number of TD-BWP switches (within the predetermined time period) is less than the threshold. The base station can stop triggering the UE to TD-BWP switch by refraining from sending the trigger message (e.g., the DCI message) to the UE.

Figure 5:
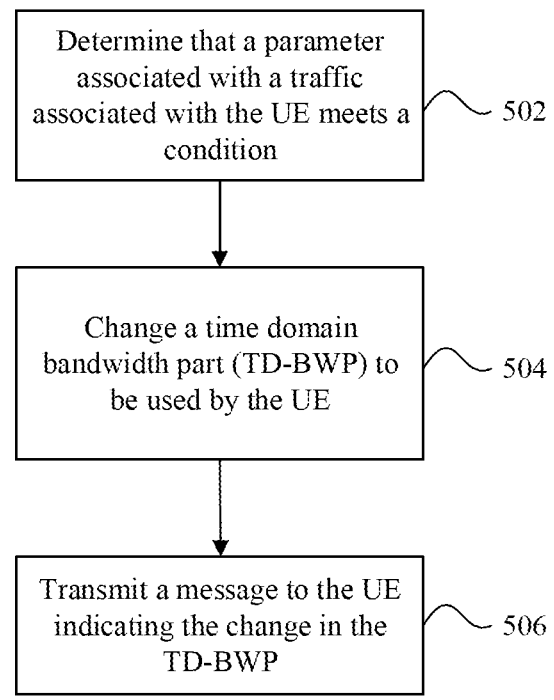
FIG. 5 illustrates an example method for a system (for example, a base station) performing TD-BWP switch based on the UE transmitting predetermined message(s) and/or based on additional measurements performed by the UE and/or the network, according to some aspects of the disclosure.

FIG. 5 illustrates an example method 500 for a system (for example, a base station) performing TD-BWP switch based on the UE transmitting predetermined message(s) and/or based on additional measurements performed by the UE and/or the network, according to some aspects of the disclosure. As a convenience and not a limitation, FIG. 5 may be described with regard to elements of FIGS. 1-4. Method 500 may represent the operation of an electronic device (for example, base station 101 of FIG. 1) performing TD-BWP switch. Method 500 may also be performed by system 200 of FIG. 2 and/or computer system 700 of FIG. 7. But method 500 is not limited to the specific aspects depicted in those figures and other systems may be used to perform the method as will be understood by those skilled in the art. It is to be appreciated that not all operations may be needed, and the operations may not be performed in the same order as shown in FIG. 5.

According to some aspects, method 500 is performed if both the network (e.g., the base station 101) and the UE (e.g., the UE 103) support TD-BWP switching. If the UE and/or the network does not support TD-BWP switching, then method 500 is not performed. Method 500 is discussed with respect to two TD-BWPs (BWP #1 and BWP #2). However, method 500 is not limited to these two TD-BWPs and can include any number of BWPs. For example, the aspects of this disclosure can include switching between any number of TD-BWPs.

According to some aspects, the UE associated with the base station operating method 500 is operating using BWP #2 (e.g., a BWP for when the data activity is low (or there is no data activity)). At 502, it is determined whether a parameter associated with a traffic associated with the UE meets a condition. For example, the base station determines whether the parameter associated with the UE traffic meets the condition.

According to some aspects, the condition can include a request for TD-BWP switch. For example, the base station receives a message from the UE during a prescheduled uplink grant and the base station examines the received message. If the received message includes a request for TD-BWP switch from the UE, the base station can determine that the parameter associated with the UE traffic meets the condition. In some implementations, the message from the UE can include one or more predetermined bytes to indicate the request for TD-BWP switch. The base station examines the one or more bytes within the message and in response to the one or more bytes indicating the request for TD-BWP switch, the base station determines that the parameter meets the condition.

According to some aspects, the message from the UE (e.g., the predetermined one or more bytes) indicating the request for TD-BWP switch are based on a traffic type associated with the UE traffic. Additionally, or alternatively, the message from the UE (e.g., the predetermined one or more bytes) indicating the request for TD-BWP switch are based on the BLER associated with the UE traffic. Additionally, or alternatively, the message from the UE (e.g., the predetermined one or more bytes) indicating the request for TD-BWP switch are based on the number of retransmissions associated with the UE traffic. According to some aspects, the message from the UE indicating the request for TD-BWP switch is a message that requests the TD-BWP switch without indicating the underlying condition for the TD-BWP switch. Additionally, or alternatively, the message from the UE indicating the request for TD-BWP switch is a message that requests the TD-BWP switch with indicating the underlying condition for the TD-BWP switch. Additionally, or alternatively, the message from the UE indicating the request for TD-BWP switch is a message that includes the traffic type, the BLER, and/or the number of retransmissions. The base station can then compare the received traffic type, BLER, and/or number of retransmissions with their associated threshold (similar to the operations performed by the UE) to determine whether or not to perform TD-BWP switch.

In addition to, or alternatively to, the predetermined message from the UE requesting the change in TD-BWP, the parameter that the base station uses to determine if a condition is met or not can include, but is not limited to, SINR value, HARQ ACK information or HARQ NACK information, CSI message, SRS, or the like.

According to some aspects, to determine that the parameter associated with the UE traffic meets the condition at 502, the base station can be configured to determine an SINR value and compare the determined SIN value with the SINR threshold. If the SINR value is less than the SINR threshold, the base station can determine that the parameter associated with the UE traffic meets the condition. If the SINR value is greater than or equal to the SINR threshold, the base station can determine that the condition is not met. In some implementation, operation 502 can include receiving the SINR value from the UE and/or other UEs. Additionally, or alternatively, operation 502 can include measuring the SINR value for one or more uplink transmissions from the UE and/or other UEs. Additionally, or alternatively, operation 502 can include measuring the SINR value for one or more downlink transmission from the UE and/or other UEs.

According to some aspects, to determine that the parameter associated with the UE traffic meets the condition at 502, the base station can be configured to determine HARQ ACK information and/or HARQ NACK information and compare the HARQ ACK information and/or the HARQ NACK information to predetermined HARQ ACK information threshold and/or the HARQ NACK information threshold (e.g., the HARQ threshold). If the HARQ ACK information and/or the HARQ NACK information meets the predetermined HARQ ACK information threshold and/or the HARQ NACK information threshold (e.g., is less than the HARQ threshold), the base station can determine that the parameter associated with the UE traffic meets the condition. If the HARQ ACK information and/or the HARQ NACK information does not meet the predetermined HARQ ACK information threshold and/or the HARQ NACK information threshold (e.g., is greater than or equal to the HARQ threshold), the base station can determine that the parameter associated with the UE traffic does not meet the condition. In some examples, the HARQ ACK information and/or the HARQ NACK information (and/or the predetermined HARQ ACK information threshold and/or the HARQ NACK information threshold) can include a number of ACKs, a number of NACKs, or any other information associated with HARQ ACK/NACK.

According to some aspects, to determine that the parameter associated with the UE traffic meets the condition at 502, the base station can be configured to receive a CSI message from the UE. The CSI message can include downlink channel quality information. The base station can compare the downlink channel quality information to one or more downlink channel quality thresholds. If the downlink channel quality information satisfies the one or more downlink channel quality thresholds, the base station can determine that the parameter associated with the ULE traffic meets the condition. If the downlink channel quality information does not satisfy the one or more downlink channel quality thresholds, the base station can determine that the parameter associated with the UE traffic does not meet the condition.

According to some aspects, to determine that the parameter associated with the UE traffic meets the condition at 502, the base station can be configured to receive a sounding reference signal (SRS) message from the UE. The SRS message can include uplink channel quality information. The base station can compare the uplink channel quality information to one or more uplink channel quality thresholds. If the uplink channel quality information satisfies the one or more uplink channel quality thresholds, the base station can determine that the parameter associated with the UE traffic meets the condition. If the uplink channel quality information does not satisfy the one or more uplink channel quality thresholds, the base station can determine that the parameter associated with the UE traffic does not meet the condition.

If the base station determines that the parameter does not meet the condition, method 500 can return to operation 502 to continue to monitor whether the condition is met or not.

If the base station determines that the parameter meets the condition, method 500 continues to 504. At 504, in response to determining that the parameter meets a condition, a TD-BWP to be used by the UE is changed. For example, assuming the UE was operating at BWP #2. At 504, the base station can change the TD-BWP to BWP #1 that can be used for higher data activity. According to some aspects, for the BWP #1, the UE receives data and/or control information or transmits data and/or control information in every slot.

At 506, a message is transmitted to the UE indicating the change in the TD-BWP. For example, the base station can send a DCI message to the UE indicating the change in the TD-BWP. In some examples, the UE knows what BWP (e.g., BWP #1) to use in response to the DCI message. Additionally, or alternatively, the DCI message can indicate BWP #1 (and/or information associated with BWP #1).

Although method 500 is discussed with respect to different parameters and conditions, method 500 can include using the combination of these parameters and conditions for the TD-BWP switch. For example, according to some aspects, the base station can use the SINR value and/or the SRS message for determining whether to trigger the TD-BWP switch when UL BLER exceeds the BLER threshold. Additionally, or alternatively, the base station can use the SINR value and/or the SRS message for determining whether to trigger the TD-BWP switch when the number of UL retransmissions exceeds the retransmission threshold. According to some aspects, the base station 101 can use the CSI and/or the HARQ ACK/NACK information for determining whether to trigger the TD-BWP switch when DL BLER exceeds the BLER threshold. Additionally, or alternatively, the base station 101 can use the CSI and/or the HARQ ACK/NACK information for determining whether to trigger the TD-BWP switch when the number of DL retransmissions exceeds the retransmission threshold.

According to some aspects, method 500 can be combined with method 400 of FIG. 4 such that the base station can monitor the number of TD-BWP switches. Additionally, or alternatively, method 500 can be combined with method 300 of FIG. 3 such that the base station can use padded TBs in addition to predetermined messages and/or measurements for TD-BWP switches.

Figure 6:
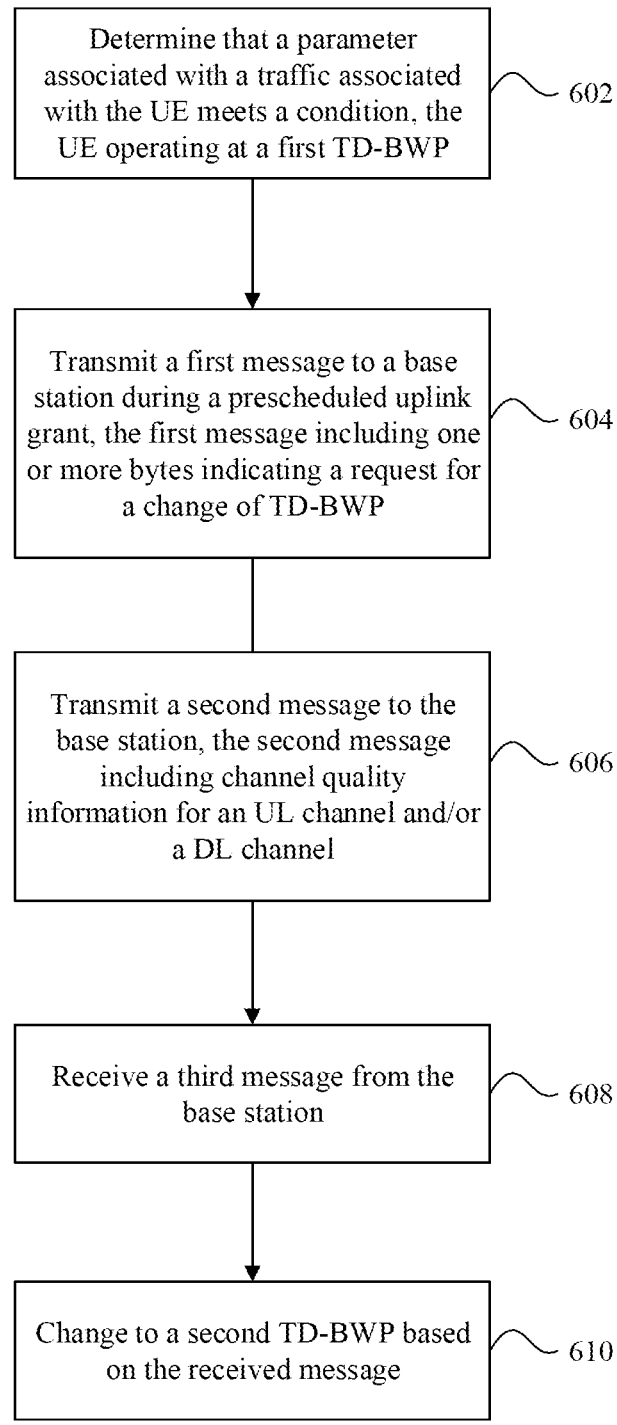
FIG. 6 illustrates an example method for a system (for example, a UE) performing TD-BWP switch based on the UE transmitting predetermined message(s) and/or based on additional measurements performed by the UE and/or the network, according to some aspects of the disclosure.

FIG. 6 illustrates an example method 600 for a system (for example, a UE) performing TD-BWP switch based on the UE transmitting predetermined message(s) and/or based on additional measurements performed by the UE and/or the network, according to some aspects of the disclosure. As a convenience and not a limitation, FIG. 6 may be described with regard to elements of FIGS. 1-5. Method 600 may represent the operation of an electronic device (for example, UE 103 of FIG. 1) performing TD-BWP switch. Method 600 may also be performed by system 200 of FIG. 2 and/or computer system 700 of FIG. 7. But method 600 is not limited to the specific aspects depicted in those figures and other systems may be used to perform the method as will be understood by those skilled in the art. It is to be appreciated that not all operations may be needed, and the operations may not be performed in the same order as shown in FIG. 6.

According to some aspects, method 600 is performed if both the network (e.g., the base station 101) and the UE (e.g., the UE 103) support TD-BWP switching. If the UE and/or the network does not support TD-BWP switching, then method 600 is not performed. Method 600 is discussed with respect to two TD-BWPs (BWP #1 and BWP #2). However, method 600 is not limited to these two TD-BWPs and can include any number of BWPs. For example, the aspects of this disclosure can include switching between any number of TD-BWPs.

According to some aspects, the UE operating method 600 is operating using BWP #2 (e.g., a BWP for when the data activity is low (or there is no data activity)). At 602, it is determined whether a parameter associated with a traffic associated with the UE meets a condition. For examples, the UE can determine whether the parameter meets the condition. If the parameter meets the condition, method 600 moves to 604. However, if the parameter does not meet the condition, method 600 can stay at 602 to periodically check whether the condition is met or not.

According to some aspects, to determine that the parameter associated with the UE traffic meets the condition, the UE can measure the BLER associated with the traffic and compare the BLER with a BLER threshold. In response to the BLER exceeding the BLER threshold, the UE determines that the parameter meets the condition. If the BLER is less than or equal to the BLER threshold, the UE determines that the parameter does not meet the condition.

According to some aspects, to determine that the parameter associated with the UE traffic meets the condition, the UE can measure a number of retransmissions associated with the traffic and compare the number of retransmissions with a retransmission threshold. In response to the number of retransmissions exceeding the retransmissions threshold, the UE can determine that the parameter associated with the UE traffic meets the condition. If the number of retransmissions is less than or equal to the retransmissions threshold, the UE can determine that the parameter associated with the UE traffic does not meet the condition.

According to some aspects, to determine that the parameter associated with the traffic associated with the UE meets the condition, the UE can determine a traffic type associated with the traffic and compare the traffic type with a plurality of traffic types. In response to the traffic type being one of the plurality of traffic types, the UE can determine that the parameter associated with the UE traffic meets the condition. If the traffic type is not one of the plurality of traffic types, the UE can determine that the parameter associated with the UE traffic does not meet the condition.

If the parameter meets the condition, at 604 a first message is transmitted to a base station during a prescheduled uplink grant. For example, the UE transmits the first message during one of the UE prescheduled uplink grants. According to some aspects, the first message can include one or more bytes indicating a request for a change of TD-BWP. The first message can include any message that can indicate the UE request for the change of TD-BWP.

Additionally, or alternatively, at 606, a second message is transmitted to the base station. In some implementations, method 600 can include both operations 604 and 606. In some implementations, method 600 can include operation 604 or operation 606. In some implementation, in one iteration, method 600 can include operation 604 and in another iteration, method 600 can include operation 606. At 606, the UE can transmit the second message to the base station, the second message including channel quality information for a UL channel and/or a DL channel.

According to some aspects, the second message can include one or more of a message including SINR value, a message including HARQ ACK/NACK information, a CSI message, a SRS message, or the like. However, the aspects of this disclosure are not limited to these examples and the second message can include other information associated with the channel quality of an UL channel and/or a DL channel.

At 608, a third message is received from the base station. For example, the UE receives the third message from the base station. According to some aspects, the third message triggers the UE to switch the TD-BWP that the UE is using. According to some implementations, the third message can include a DCI message.

At 610, the UE changes the TD-BWP on which the UE is operating based on the received third message. For example, the UE can changes its TD-BWP from BWP #2 to BWP #1 that can be used for higher data activity. According to some aspects, for the BWP #1, the UE receives data and/or control information or transmits data and/or control information in every slot.

According to some aspects, method 600 can repeat for a predetermined time period. Additionally, or alternatively, the UE can operate at the up switched BWP (e.g., BWP #1) for the predetermined time period. After the predetermined time period, the UE can down switch (e.g., to BWP #2). In some aspects, the UE can stop sending the first and/or second messages to down switch. In these examples, method 600 can move back to operation 602 to determine whether a second parameter associated with the UE traffic meets a second condition. The UE can perform operations 604-610 if the second condition is met.

According to some aspects, method 600 can be combined with method 300 of FIG. 3 such that the UE can use padded TBs in addition to predetermined messages and/or measurements for TD-BWP switches. Additionally, or alternatively, method 600 can be combined with method 300 of FIG. 3 such that the base station can monitor the number of TD-BWP switches based on method 600.

Figure 7:
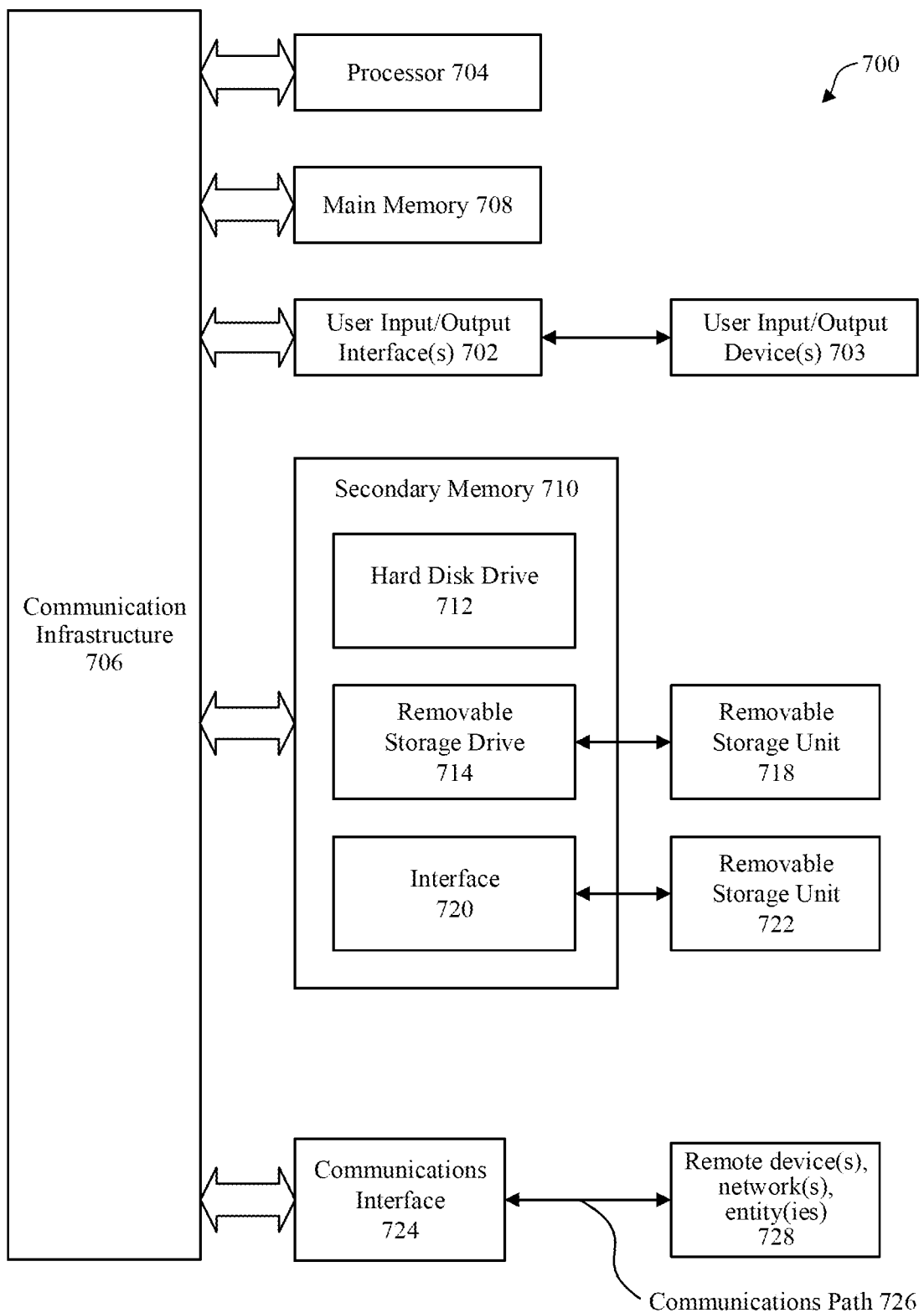
FIG. 7 is an example computer system for implementing some aspects or portion(s) thereof.

Various aspects can be implemented, for example, using one or more computer systems, such as computer system 700 shown in FIG. 7. Computer system 700 can be any well-known computer capable of performing the functions described herein such as devices 101, 103 of FIG. 1, and/or 200 of FIG. 2. Computer system 700 includes one or more processors (also called central processing units, or CPUs), such as a processor 704. Processor 704 is connected to a communication infrastructure 706 (e.g., a bus). Computer system 700 also includes user input/output device(s) 703, such as monitors, keyboards, pointing devices, etc., that communicate with communication infrastructure 706 through user input/output interface(s) 702. Computer system 700 also includes a main or primary memory 708, such as random access memory (RAM). Main memory 708 may include one or more levels of cache. Main memory 708 has stored therein control logic (e.g., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 includes a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 reads from and/or writes to removable storage unit 718 in a well-known manner.

According to some aspects, secondary memory 710 may include other means, instrumentalities or other approaches for allowing computer programs and/or other instructions and/or data to be accessed by computer system 700. Such means, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 enables computer system 700 to communicate and interact with any combination of remote devices, remote networks, remote entities, etc. (individually and collectively referenced by reference number 728). For example, communication interface 724 may allow computer system 700 to communicate with remote devices 728 over communications path 726, which may be wired and/or wireless, and which may include any combination of LANs, WANs, the Internet, etc. Control logic and/or data may be transmitted to and from computer system 700 via communication path 726.

The operations in the preceding aspects can be implemented in a wide variety of configurations and architectures. Therefore, some or all of the operations in the preceding aspects may be performed in hardware, in software or both. In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, computer system 700, main memory 708, secondary memory 710 and removable storage units 718 and 722, as well as tangible articles of manufacture embodying any combination of the foregoing. Such control logic, when executed by one or more data processing devices (such as computer system 700), causes such data processing devices to operate as described herein.

Based on the teachings contained in this disclosure, it will be apparent to persons skilled in the relevant art(s) how to make and use aspects of the disclosure using data processing devices, computer systems and/or computer architectures other than that shown in FIG. 7. In particular, aspects may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more, but not all, exemplary aspects of the disclosure as contemplated by the inventor(s), and thus, are not intended to limit the disclosure or the appended claims in any way.

While the disclosure has been described herein with reference to exemplary aspects for exemplary fields and applications, it should be understood that the disclosure is not limited thereto. Other aspects and modifications thereto are possible, and are within the scope and spirit of the disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative aspects may perform functional blocks, steps, operations, methods, etc. using orderings different from those described herein.

References herein to "one aspect," "aspects" "an example," "examples," or similar phrases, indicate that the aspect(s) described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it would be within the knowledge of persons skilled in the relevant art(s) to incorporate such feature, structure, or characteristic into other aspects whether or not explicitly mentioned or described herein.

The breadth and scope of the disclosure should not be limited by any of the above-described exemplary aspects, but should be defined only in accordance with the following claims and their equivalents.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

What is claimed is:

1. A base station, comprising:
a transceiver configured to wirelessly communicate with a user equipment (UE), wherein the UE operates at a first time domain bandwidth part (TD-BWP); and
a processor communicatively coupled to the transceiver and configured to:
receive, using the transceiver, a message from the UE during a prescheduled uplink grant;
examine one or more bytes within the message;
in response to the one or more bytes indicating a request for a change of the first TD-BWP, determine that a parameter associated with UE traffic meets a condition;
in response to determining that the parameter associated with the UE traffic meets the condition, change the first TD-BWP to a second TD-BWP to be used by the UE; and
transmit, using the transceiver, a downlink control information (DCI) message to the UE indicating the change to the second TD-BWP.

2. The base station of claim 1, wherein the one or more bytes indicating the request for the change of the first TD-BWP are based on a traffic type associated with the UE traffic.

3. The base station of claim 1, wherein the one or more bytes indicating the request for the change of the first TD-BWP are based on a block error rate (BLER) associated with the UE traffic or a number of retransmissions associated with the UE traffic.

4. The base station of claim 1, wherein to determine that the parameter associated with the UE traffic meets the condition, the processor is further configured to:
determine a signal to interference and noise ratio (SINR) value;
compare the SINR value to a threshold; and
in response to the SINR value being less than the threshold, determine that the parameter associated with the UE traffic meets the condition.

5. The base station of claim 4, wherein the processor is configured to:
receive, using the transceiver, a message from the UE indicating the SINR value; or
measure the SINR value for one or more uplink transmissions from the UE.

6. The base station of claim 1, wherein to determine that the parameter associated with the UE traffic meets the condition, the processor is further configured to:
determine hybrid automatic repeat request (HARQ) acknowledgment (ACK) information or HARQ negative acknowledgement (NACK) information;
compare the HARQ ACK information or the HARQ NACK information to a threshold; and
in response to the HARQ ACK information or the HARQ NACK information being less than the threshold, determine that the parameter associated with the UE traffic meets the condition.

7. The base station of claim 1, wherein to determine that the parameter associated with the UE traffic meets the condition, the processor is further configured to:
receive, using the transceiver, a channel state information (CSI) message from the UE, the CSI message including downlink quality channel information;
compare the downlink channel quality information to one or more thresholds; and
in response to the downlink channel quality information satisfying the one or more thresholds, determine that the parameter associated with the UE traffic meets the condition.

8. The base station of claim 1, wherein to determine that the parameter associated with the UE traffic meets the condition, the processor is further configured to:
receive, using the transceiver, a sounding reference signal (SRS) message from the UE, the SRS message including uplink channel quality information;
compare the uplink channel quality information to one or more thresholds; and
in response to the uplink channel quality information satisfying the one or more thresholds, determine that the parameter associated with the UE traffic meets the condition.

9. A method, comprising:
comparing, by a base station in communication with a user equipment (UE), at least one of a signal to interference and noise ratio (SINR) value, hybrid automatic repeat request (HARQ) acknowledgment (ACK) information or HARQ NACK information, downlink channel quality information, or uplink channel quality information to a respective threshold, wherein the UE operates at a first time domain bandwidth part (TD-BWP);
in response to the at least one of the SINR value, the HARQ ACK information or the HARQ NACK information, the downlink quality information, or the uplink quality information satisfying the respective threshold, determining that a parameter associated with UE traffic meets a condition;
in response to determining that the parameter meets the condition, changing the first TD-BWP to a second TD-BWP to be used by the UE; and
transmitting a downlink control information (DCI) message to the UE indicating the change to the second TD-BWP.

10. The method of claim 9, further comprising:
receiving a message from the UE during a prescheduled uplink grant;
examining one or more bytes within the message; and
in response to the one or more bytes indicating a request for a change of the first TD-BWP, determining that the parameter associated with the UE traffic meets the condition,
wherein the one or more bytes indicating the request for the change of the first TD-BWP are based on a traffic type associated with the UE traffic or are based on a block error rate (BLER) associated with the UE traffic or a number of retransmissions associated with the UE traffic.

11. The method of claim 10, wherein the determining that the parameter associated the UE traffic meets the condition further comprises:
  receiving a message from the UE indicating the SINR value;
  determining the SINR value;
  comparing the SINR value to the respective threshold; and
  in response to the SINR value being less than the respective threshold, determining that the parameter associated with the UE traffic meets the condition.

12. The method of claim 9, wherein the determining that the parameter associated with the UE traffic meets the condition further comprises:
  determining the HARQ ACK information or HARQ NACK information;
  comparing the HARQ ACK information or the HARQ NACK information to the respective threshold; and
  in response to the HARQ ACK information or the HARQ NACK information being less than the respective threshold, determining that the parameter associated with the UE traffic meets the condition.

13. The method of claim 9, wherein the determining that the parameter associated with the UE traffic meets the condition further comprises:
  receiving a channel state information (CSI) message from the UE, the CSI message including the downlink channel quality information;
  comparing the downlink channel quality information to the respective threshold; and
  in response to the downlink channel quality information satisfying the respective threshold, determining that the parameter associated with the UE traffic meets the condition.

14. The method of claim 9, wherein the determining that the parameter associated with the UE traffic meets the condition further comprises:
  receiving a sounding reference signal (SRS) message from the UE, the SRS message including the uplink channel quality information;
  comparing the uplink channel quality information to the respective threshold; and
  in response to the uplink channel quality information satisfying the respective threshold, determining that the parameter associated with the UE traffic meets the condition.

15. A user equipment (UE), comprising:
  a transceiver configured to wirelessly communicate with a base station; and
  a processor communicatively coupled to the transceiver and configured to:
    in response to determining that a parameter associated with UE traffic meets a condition, transmit, using the transceiver, a first message to the base station during a prescheduled uplink grant,
    wherein the UE operates at a first time domain bandwidth part (TD-BWP) and the message comprises one or more bytes indicating a request for a change of the first TD-BWP;
    receive, using the transceiver, a second message from the base station; and
    change the first TD-BWP to a second TD-BWP based on the received message.

16. The UE of claim 15, wherein to determine that the parameter associated with the UE traffic meets the condition, the processor is configured to:
  measure a block error rate (BLER) associated with the UE traffic;
  compare the BLER with a threshold; and
  in response to the BLER being greater than the threshold, determine that the parameter associated with the UE traffic meets the condition.

17. The UE of claim 15, wherein to determine that the parameter associated with the UE traffic meets the condition, the processor is configured to:
  measure a number of retransmissions associated with the UE traffic;
  compare the number of retransmissions with a threshold; and
  in response to the number of retransmissions being greater than the threshold, determine that the parameter associated with the UE traffic meets the condition.

18. The UE of claim 15, wherein to determine that the parameter associated with the UE traffic meets the condition, the processor is configured to:
  measure a traffic type associated with the UE traffic;
  compare the traffic type with a plurality of traffic types; and
  in response to the traffic type being one of the plurality of traffic types, determine that the parameter associated with the UE traffic meets the condition.

19. The UE of claim 15, wherein the processor is further configured to transmit, using the transceiver, a third message to the base station, the third message including channel quality information for an uplink channel or for a downlink channel.

* * * * *